3,060,216
COMPLEX METAL ALUMINUM HYDRIDES AND
THEIR PRODUCTION
Guenther Hamprecht, Limburgerhof, Pfalz, and Matthias
Schwarzmann, Ludwigshafen (Rhine), Germany, assignors to Badische Anilin- & Soda-Fabrik Aktiengesellschaft, Ludwigshafen (Rhine), Germany
No Drawing. Filed Dec. 8, 1959, Ser. No. 858,075
3 Claims. (Cl. 260—448)

This invention relates to new complex metal aluminum hydrides of the general formula:

$$Me[AlH_2R(OR')]_n$$

in which Me represents a metal from the group consisting of lithium, sodium, potassium, magnesium and calcium, $n$ is the valency of Me and R and R′ represent hydrocarbon radicals, and to a process for the production of the same.

Complex alkali metal aluminum hydrides, as for example lithium alanate, are already known and have very good reducing properties. However they have not hitherto been used as such in practice because they are very dangerous to handle. The same is true of their solutions. The known alkali metal aluminum hydrides ignite spontaneously in the air and under certain conditions even decompose spontaneously. Moreover it is necessary to work in ethereal solution because the known alkali metal aluminum hydrides are insoluble in non-polar solvents, as for example hydrocarbons.

We have now found that complex metal aluminum hydrides of the general formula $Me[AlH_2R(OR')]_n$ (in which Me, $n$, R and R′ have the meanings given above) have the same reducing power as the known metal aluminum hydrides but without the said disadvantages. R may especially be an alkyl or cycloalkyl radical and R′ an alkyl, cycloalkyl or aryl radical. R is preferably an alkyl radical with up to 6 and especially with up to 4 carbon atoms. The cyclohexyl radical is the preferred cycloalkyl radical. It is also especially advantageous for R′ to be an alkyl radical with up to 4 carbon atoms, but radicals of higher molecular weight, as for example with up to 20 carbon atoms, also lend themselves well. As cycloalkyl radicals there may serve cyclopentyl or cyclohexyl radicals, and as aryl radical, the phenyl radical is preferred. Examples of especially suitable radicals for R are methyl, ethyl, propyl, butyl, hexyl, octyl and dodecyl radicals and for R′ the same alkyl radicals, but also alkyl radicals with 14, 16 and 18 carbon atoms.

The new complex compounds are derived from complex compounds of the type $Me(AlH_4)_n$ in which Me and $n$ have the meanings given above and in which one hydrogen atom of the radical ($AlH_4$) has been replaced by an alkyl or cycloalkyl group and another hydrogen atom by an alkoxy, cycloalkoxy or aryloxy group. By the introduction of the alkyl group into the radical ($AlH_4$) the complex compound acquires sufficient solubility in hydrocarbons and by the introduction of the radical (OR′) the known complex compound is desensitized to such an extent that even concentrated solutions no longer ignite spontaneously. Even when concentrated solutions are brought into contact with water there is no ignition, but only decomposition.

The new compounds of the general formula $$Me[AlH_2R(OR')]_n$$

are prepared by reacting a compound of the general formula AlXR(OR′) (in which X represents chlorine or bromine and R and R′ have the meanings given above) with a hydride of lithium, sodium, potassium, calcium or magnesium. In order to achieve a complete reaction it is necessary to react 1 mol of the compound AlXR(OR′) with 2 mols of lithium hydride, sodium hydride or potassium hydride or with 1 mol of calcium hydride or magnesium hydride. Obviously one or the other of the initial compounds may be used in excess provided this excess is not troublesome in the use of the reaction product or can be removed therefrom by a purification treatment.

The reaction is carried out in the presence of an organic diluent which may be a solvent or suspension agent that is inert to the reactants and the end products. Ethers are especially suitable for this purpose and among these those with boiling points between about 60° and 160° C. Low-boiling ethers may however also be used. Any aliphatic, symmetrical or unsymmetrical ether is suitable, as for example diethyl ether, di-isoppropyl ether, ethyl propyl ether, but also mixed aliphatic-aromatic ethers such as anisole and also cyclic ethers, as for example tetrahydrofurane or dioxane. Hydrocarbons are also very often well suited as solvents or suspension agents. These, like the ethers used, are preferably saturated, but this is not essential. The hydrocarbons may be of aliphatic, cycloaliphatic or aromatic character. They preferably contain only carbon and hydrogen. Examples are pentane, hexane, octane, gasoline and gasoline fractions, cyclohexane, benzene, xylene, iso-octane, methylcyclohexane, toluene, tetrahydronaphthalene, and decahydronaphthalene. Their boiling points preferably lie between about 60° and 200° C. When a hydrocarbon is used as solvent or suspension agent, it is recommended that it should be used in admixture with an ether, because ethers act as activators in the reaction in question. Since both the ethers and the hydrocarbons can be used alone, the two groups of solvents may be used mixed together in any desired ratio.

The reaction is preferably carried out at temperatures between about 20° and about 100° C. It is possible to work at lower temperatures, for example at —30° C., if suitable solvents are chosen. The upper temperature limit is set by the decomposition temperature of the new complex compounds obtained. It amounts in general to about 150° to 200° C.

An especially favorable embodiment of the process consists in adding to the metal hydride present in a suspension agent, prior to the reaction, a certain amount of the new complex compound which it is desired to obtain, in solid, dissolved or suspended form. This ensures that the reaction will initiate more readily. It is preferable to use at least 0.5% by weight of the complex compound with reference to the amount of reaction product to be expected. There is no upper limit to the amount of the complex compound to be used. For example the metal hydride and the compound AlXR(OR′) may be introduced alternately into a solution or suspension of the compound $Me[AlH_2R(OR')]_n$ in the desired mol ratio.

The metal halide formed during the reaction is in general not troublesome in the use of the reaction products. If however it is desired to remove it, this can be done without trouble by filtering off or centrifuging. From the resultant clear solution, the pure new compounds can be obtained in crystalline form by removal of the solvent. The new compounds are not only excellent reducing agents but may also be used as intermediate products, for example for the production of other metal compounds containing hydrogen or alkyl radicals.

The following examples will further illustrate this invention but the invention is not restricted to these examples. The parts specified in the examples are parts by weight.

*Example 1*

48 parts of sodium hydride (NaH) and 20 parts of tetrahydrofurane are placed in a stirring vessel while excluding air and moisture. 10 parts of $$AlCl(C_2H_5)(OC_2H_5)$$

are allowed to flow in and the commencement of the reaction, which can be detected by a rise in temperature of from 30° to 50° C., is awaited. Then another 200 parts of tetrahydrofurane are added and, while stirring, another 126 parts of $AlCl(C_2H_5)(OC_2H_5)$ added at such a speed that the temperature in the stirring vessel does not rise above 70° C. Heat is led away by intensive cooling of the stirring vessel.

After all the $AlCl(C_2H_5)(OC_2H_5)$ has been added, the stirring vessel contains a solution of 126 parts of $$Na[AlH_2(C_2H_5)(OC_2H_5)]$$

in 220 parts of tetrahydrofurane and also 58 parts of sodium chloride suspended therein. The suspension can be used immediately for reducing purposes.

Example 2

The reaction is carried out as described in Example 1. The suspension obtained is centrifuged while excluding air and the clear solution concentrated in vacuo. Toward the end heating is carried out at 70° to 90° C. 108 parts of $Na[AlH_2(C_2H_5)(OC_2H_5)]$ are obtained in the form of white crystals.

Example 3

48 parts of sodium hydride (NaH) and 300 parts of octane are placed in a stirring vessel and 20 parts of $Na[AlH_2(C_2H_5)(OC_2H_5)]$ dissolved in 30 parts of tetrahydrofurane are added. Then 136 parts of $$AlCl(C_2H_5)(OC_2H_5)$$

are allowed to flow in with intensive stirring in such a way that the temperature does not rise above 100° C. A solution of 146 parts of $Na[AlH_2(C_2H_5)(OC_2H_5)]$ in 330 parts of solvent is obtained. The solution can be immediately used in this form.

Example 4

To the suspension of $Na[AlH_2(C_2H_5)(OC_2H_5)]$ obtained according to Example 3 there are added another 300 parts of octane and 48 parts of sodium hydride and, while adopting the same precautions, another 136 parts of $AlCl(C_2H_5)(OC_2H_5)$ are allowed to flow in. There result in all 272 parts of $Na[AlH_2(C_2H_5)(OC_2H_5)]$. This cycle can be repeated as often as desired with partial withdrawal of the finished reaction product.

Example 5

In the manner described in Example 1, 48 parts of sodium hydride are reacted in 400 parts of tetrahydrofurane with 164 parts of $AlCl(C_2H_5)(OC_4H_9)$. There results a solution or suspension of 153 parts of $$Na[AlH_2(C_2H_5)(OC_4H_9)]$$

and 58 parts of sodium chloride in 400 parts of tetrahydrofurane.

Example 6

In the manner described in Example 1, 48 parts of sodium hydride are reacted in 400 parts of tetrahydrofurane with 184 parts of $AlCl(C_2H_5)(OC_6H_5)$. After the reaction has ended, the sodium chloride which has separated out is centrifuged off and the solution evaporated in vacuo. 140 parts of $Na[AlH_2(C_2H_5)(OC_6H_5)]$ are obtained in the form of white somewhat greasy crystals.

Example 7

In the manner described in Example 1, 82 parts of potassium hydride are reacted with 136 parts of $$AlCl(C_2H_5)(OC_2H_5)$$

in 600 parts of tetrahydrofurane. The reaction proceeds somewhat more rapidly than in the case of sodium hydride and there results a solution of $K[AlH_2(C_2H_5)(OC_2H_5)]$ in a practically quantitative yield.

Example 8

45 parts of finely ground commercial calcium hydride are heated for 5 hours at 90° C. with 136 parts of $$AlCl(C_2H_5)(OC_2H_5)$$

in 500 parts of tetrahydrofurane in a rolling autoclave which contains steel balls. After the reaction has ended, there is obtained a solution of about 120 parts of $$Ca[AlH_2(C_2H_5)(OC_2H_5)]_2$$

in which 55 parts of calcium chloride are suspended. The mixture can be used immediately for reducing purposes.

Example 9

In the manner described in Example 1, 48 parts of sodium hydride are reacted in 250 parts of tetrahydrofurane with 181 parts of $AlBr(C_2H_5)(OC_2H_5)$. The reaction proceeds smoothly and with a practically quantitative yield with the formation of sodium bromide and $Na[AlH_2(C_2H_5)(OC_2H_5)]$.

Example 10

A solution of 50 parts of benzophenone in 200 parts of toluene is introduced into a stirring vessel provided with a reflux condenser and at 20° C. while excluding air and moisture, a suspension of 35 parts of $$Na[AlH_2(C_2H_5)(OC_2H_5)]$$

in 150 parts of octane or cyclohexane is allowed to flow in within 15 minutes while cooling. The temperature thereby rises to about 70° C. The reaction mixture is kept for two hours at refluxing temperature of the solvent and then cooled to 20° C. By adding 200 parts of water within 15 minutes, the temperature rises to 75° to 80° C. The colorless mixture consists of two phases. The toluene/octane(cyclohexane) layer is separated, dried with calcium chloride, filtered, evaporated and there are obtained 46 parts (equal to 91% of the theoretical yield) of benzhydrol as a snow-white crystal powder of the melting point 66° to 67° C. The mixed melting point with a standard preparation showed no depression.

What we claim is:

1. Complex metal aluminum hydrides of the general formula $Me[AlH_2R(OR')]_n$ in which Me represents a metal selected from the group consisting of lithium, sodium, potassium, magnesium and calcium, R stands for a hydrocarbon radical selected from the group consisting of alkyl containing 1 to 12 carbon atoms and cyclohexyl, and R' stands for a hydrocarbon radical selected from the group consisting of alkyl containing up to 20 carbon atoms, cyclopentyl, cyclohexyl and phenyl and $n$ is the valency of the metal.

2. Complex metal aluminum hydrides of the general formula $Me[AlH_2R(OR')]_n$ in which Me represents a metal selected from the group consisting of lithium, sodium, potassium, magnesium and calcium, R and R' stand for alkyl containing from 1 to 4 carbon atoms and $n$ is the valency of the metal.

3. A process for the production of complex metal aluminum hydrides of the general formula $$Me[AlH_2R(OR')]_n$$

in which Me represents a metal selected from the group consisting of lithium, sodium, potassium, magnesium and calcium, R stands for a hydrocarbon radical selected from the group consisting of alkyl containing 1 to 12 carbon atoms and cyclohexyl, R' stands for a hydrocarbon radical selected from the group consisting of alkyl containing up to 20 carbon atoms, cyclopentyl, cyclohexyl and phenyl, and $n$ is the valency of the metal, wherein 1 mol of the compound AlXR(OR') in which X represents halogen with an atomic weight between 35 and 80 and R is a hydrocarbon radical selected from the group consisting of alkyl containing 1 to 12 carbon atoms and cyclohexyl and R' stands for a hydrocarbon radical selected from the group consisting of alkyl containing up to 20 carbon atoms, cyclopentyl, cyclohexyl and phenyl is reacted with two atoms of hydride hydrogen of a hydride of a metal selected from the group consisting of lithium, sodium, potassium, calcium and magnesium, the reaction being carried out in an inert organic diluent.

References Cited in the file of this patent

UNITED STATES PATENTS 2,867,643     Hamprecht et al. _____ Jan. 6, 1959
2,915,541     Ziegler et al. _____ Dec. 1, 1959

OTHER REFERENCES

Grosse et al.: Library Bulletin of Abstracts, Universal Oil Products Co., 13 (Oct. 12, 1938), p. 164, top left item.